March 1, 1966 E. E. LOVELL 3,237,868
NOZZLE SUPPORT FOR WINDSHIELD CLEARING SYSTEMS
Filed Nov. 1, 1963 2 Sheets-Sheet 1
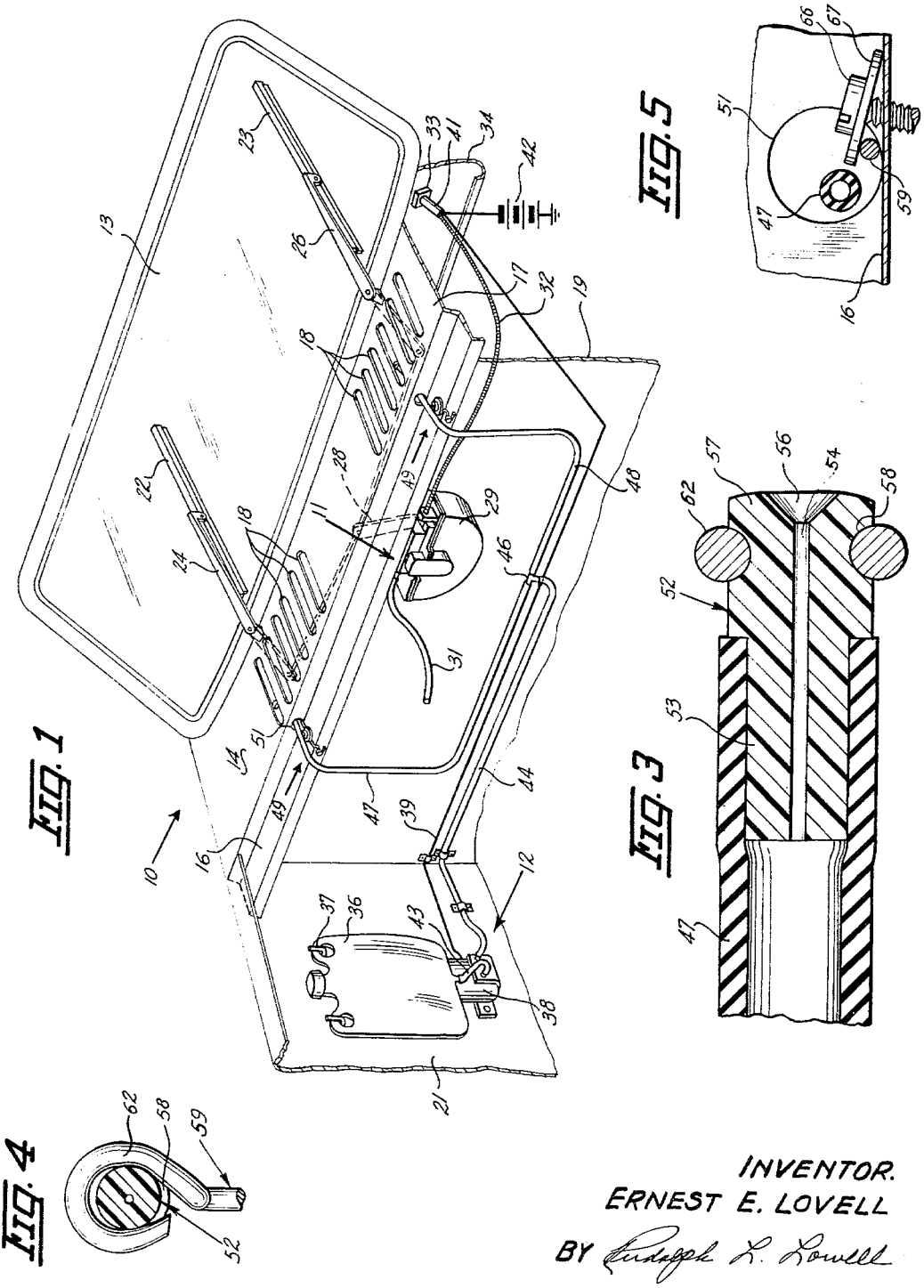
INVENTOR.
ERNEST E. LOVELL
BY Rudolph L. Lovell
ATTORNEY.

March 1, 1966  E. E. LOVELL  3,237,868
NOZZLE SUPPORT FOR WINDSHIELD CLEARING SYSTEMS
Filed Nov. 1, 1963
2 Sheets-Sheet 2
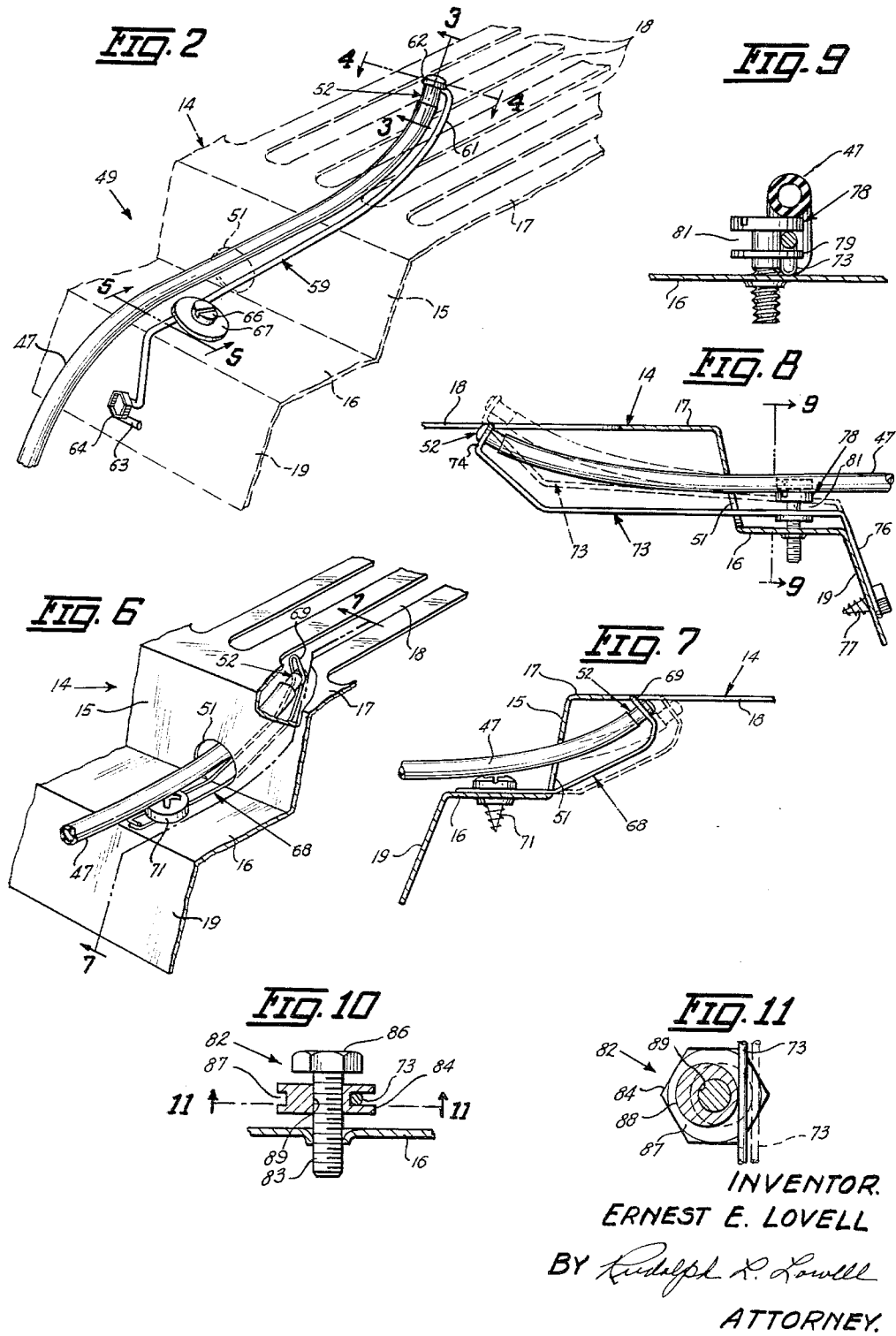
INVENTOR.
ERNEST E. LOVELL
BY Rudolph L. Lowell
ATTORNEY.

United States Patent Office 3,237,868
Patented Mar. 1, 1966

3,237,868
NOZZLE SUPPORT FOR WINDSHIELD CLEARING SYSTEMS
Ernest E. Lovell, Detroit, Mich., assignor to The Delman Company, Cookeville, Tenn., a corporation of Tennessee
Filed Nov. 1, 1963, Ser. No. 320,744
9 Claims. (Cl. 239—284)

This invention relates to windshield clearing systems and more particularly to a windshield washer nozzle and nozzle support for mounting the nozzle on a vehicle to direct windshield washing fluid discharged by the nozzle onto the windshield of the vehicle.

It is the object of this invention to provide an improved support for attaching a winshield washer nozzle to the body of a vehicle.

Another object of the invention is to provide a flexible windshield nozzle support for connecting a washer nozzle to the body of a vehicle which is adjustable to move the nozzle relative to the vehicle.

A further object of the invention is to provide a flexible support for a nozzle and means for retaining the flexible support in a selected adjusted position.

Still another object of the invention is to provide a versatile windshield washer nozzle and nozzle support for attaching the nozzle to the body of a vehicle which is readily installed and has a minimum number of parts.

An additional object of the invention is to provide a rugged and durable support for a nozzle which is reliable and efficient in use, relatively simple, and economical in construction and cost of installation.

Further objects and advantages of this invention will appear from the following description when taken in connection with the accompanying drawing, in which:

FIG. 1 is a fragmentary perspective view of a motor vehicle showing a windshield clearing system, embodying the nozzle and nozzle support assembly of this invention;

FIG. 2 is an enlarged detailed perspective view of the nozzle and nozzle support assembly of FIG. 1 in assembled relation with the cowl of a vehicle;

FIG. 3 is an enlarged cross sectional view taken along the line 3—3 of FIG. 2 illustrating the construction of the nozzle;

FIG. 4 is an enlarged cross sectional view taken along the line 4—4 of FIG. 2;

FIG. 5 is an enlarged cross sectional view taken along the line 5—5 of FIG. 2;

FIG. 6 is a perspective view of a modification of the nozzle support of FIG. 2 in assembled relation with the cowl of a vehicle;

FIG. 7 is a sectional view taken along the line 7—7 of FIG. 6;

FIG. 8 is a side elevational view of another modification of the nozzle support in FIG. 1 in assembled relation with the cowl of a vehicle;

FIG. 9 is an enlarged sectional view taken along the line 9—9 of FIG. 8;

FIG. 10 is an enlarged sectional view similar to FIG. 8 showing a modified adjusting nut and bolt assembly; and FIG. 11 is an enlarged sectional view taken along the line 11—11 of FIG. 10.

Referring to the drawing, there is shown in FIG. 1 a vehicle 10 having a windshield clearing system comprising a wiper unit 11 and a washer unit 12. The vehicle 10 is shown in fragmentary form having an upwardly extended windshield 13. A cowl 14 extends forward from the lower edge of the winshield 13 and has a downwardly stepped forward section forming an upright wall 15 and a horizontal wall 16 to accommodate the rear section of the hood (not shown). The cowl 14 has a louver section 17 adjacent the forward edge of the windshield 13. A series of spaced openings 18 in the louver section 17 form passages for the ventilating system of the vehicle. A downwardly projecting fire wall 19 is secured to the wall 16 of the cowl and joins with a side wall 21 of the body of the vehicle 10.

The windshield wiper unit 11 comprises a pair of wiper elements 22 and 23 which engage the outside surface of the windshield 13. The wiper elements 22 and 23 are mounted on the cowl 14 by arm members 24 and 26, respectively. A linkage 28 drivably connects the arms 24 and 26 with a conventional drive motor 29 which may be pneumatic, hydraulic, or electrical in character. The motor 29 is mounted to the body of the vehicle below the cowl 14 and has a vacuum line 31 connected to a source of vacuum such as the intake manifold of an internal combustion engine. The operation of the motor 29 is controlled through a Bowden cable 32 which is connected to a suitable control member 33 mounted on the dashboard 34 of the vehicle.

The control member 33 is manually actuated to connect the motor 29 to the vacuum source. The motor 29 is responsive to a vacuum pressure to reciprocate the linkage 28 to effectuate oscillatory movement of the wiper elements 22 and 23 over the windshield 13. The wiper elements are driven in a normal wiping pattern and automatically return to a depressed park position adjacent the bottom edge of the windshield 13 when the motor 29 is turned off.

The washer unit 12 comprises a fluid container or reservoir 36 for storing the windshield washing solvent. The reservoir 36 is mounted on the body side wall 21 by a bracket 37. Positioned below the reservoir 36 is a combination electric motor and pump assembly 38. An electric lead 39 connects the motor of the assembly 38 with a switch 41 mounted on the dashboard 34. The switch 41 is operative to connect and disconnect the electric lead with a battery 42. A manual operation of the switching 41 results in the energizing and de-energizing of the electric motor of the pump assembly 38.

The pump of the assembly 38 is drivably connected to the motor and has an input hose 43 which is connected to the bottom of the reservoir 36. The output side of the pump is connected to a hose 44 which carries fluid under pressure to a T fitting 46. A pair of hoses 47 and 48 are coupled to the T fitting 46 and extend upwardly along the fire wall 19 and over the downwardly stepped portion of the cowl 14. Each of the hoses 47 and 48 is connected to a nozzle and nozzle support assembly indicated generally by the numeral 49.

As shown in FIG. 2 the hose 47 extends through a hole 51 in the upright wall 15 of the cowl 14 and has inserted in the end thereof a nozzle 52. As illustrated in FIG. 3, the hose 47 is formed from a rubber material and is in firm engagement with the rear section 53 of the nozzle 52. The nozzle 52 is formed from a rigid plastic material and has a relatively small longitudinal bore 54 forming a passage for the cleaning fluid. The bore 54 opens into a conical shaped cavity 56 in the head of the nozzle. The peripheral surface of the head section 57 of the nozzle 52 has an annular groove 58 which cooperates with the nozzle support to hold the nozzle 52 in a selected position.

As shown in FIG. 2, the nozzle and the nozzle support assembly 49 has a resilient support member 59 which is formed from a relatively stiff deformable wire. The member 59 extends through the hole 51 in the cowl and has an upper end section 61 which is curved in an upward direction and terminates in an inverted U-shaped end 62. As shown in FIG. 4, the legs of the U-shaped end 62 are positioned in the annular groove 58 of the nozzle 52 and grip the nozzle to securely attach the nozzle to the member 59. Referring to FIG. 2 it is seen that member 59 is positioned adjacent the horizontal wall 16 of the cowl and is bent in a downward direction along the fire wall 19 terminating in a laterally extended hook 63. A screw 64 engages the hook 63 and is threaded into the fire wall 19 to securely attach the member 59 to the body of the vehicle.

The position of the nozzle 52 with respect to the cowl 14 is determined by the contour of the member 59. Initially the member 59 is deformed to place the nozzle 52 in registration with one of the openings 18 in the cowl.

In order to retain the nozzle in its adjusted position and provide for further finite adjustments thereof a screw and washer 66 is threaded into the horizontal wall 16 of the cowl in engagement with the top of the member 59. As shown in FIG. 5, the screw 66 is threaded into the wall 16 of the cowl at an angle such that one edge of the washer 67 engages the wall 16 and the opposite portion of the washer 67 engages the top of the member 59. When the angularly disposed screw 66 is adjusted the washer 67 moves the member 59 in both a horizontal and a vertical direction. This same movement is imparted to the nozzle 52 and results in the movement of the impact position of the cleaning fluid on the windshield 13.

This adjustment may be made during the operation of the washing unit 12 by merely turning the switch 41 to the "on" position thereby energizing the motor of the assembly 43. The pump of this assembly withdraws cleaning fluid from the reservoir 36 and discharges the cleaning fluid under pressure to the hose 44. The cleaning fluid flows through the hoses 47 and 48 to the nozzles 52 of the respective nozzle and support assemblies 49. The cleaning fluid under pressure in the hoses 47 and 48 is discharged through the nozzles 52 as a stream of fluid directed toward the windshield 13. This stream of cleaning fluid will be continuous as long as the pump of the assembly 43 is in operation. By adjusting the screw 66 as explained above the impact location of the stream of fluid on the windshield 12 may be altered and retained in a selected position.

Referring to FIG. 6, there is shown a nozzle 52 mounted below the louvered section 17 of the cowl by a modified nozzle support member 68 which has resilient characteristics similar to the support member 59 of FIG. 2. The support member 68 is formed from a single piece of deformable wire which is reversely bent to form an elongated and closed loop. The apex section 69 of the wire is of an inverted V-shape and engages opposite sectors of the nozzle 52 as shown in FIG. 6. The section 69 extends in an upward and forward direction and aligns the nozzle 52 with an opening 18 in the cowl 14.

As illustrated in FIG. 7, the support member 68 is secured to the horizontal wall 16 of the cowl 14 by a screw 71 which holds the opposite ends of the wire support member 68 in engagement with the wall 16. In order to change the position of the nozzle 52 with respect to the cowl 14 the support member 68 is deformed to a desired position as illustrated by the dotted lines in FIG. 7. As seen in FIG. 6, the resilient support member 68 has a pair of wire members which clamp about the nozzle 52 and extend in a downward and forward direction through the hole 51 in the cowl 14. The two wire members are positioned on opposite sides of the screw 71. In addition to deforming the wire the position of the nozzle 52 may be adjusted by loosening the screw 71 and moving the wire of the support member relative to the screw. Since only one screw 71 fastens the support member 68 to the cowl 14 the wire support member may be moved in a longitudinal direction and rotated about the axis of the screw whereby the point of impact of the cleaning fluid on the windshield may be transversely and vertically altered. This adjustment may be done concurrently with the dispensing of cleaning fluid onto the windshield to thereby eliminate a trial and error adjustment procedure.

The modified nozzle and nozzle support structure shown in FIG. 8 includes the nozzle 52 which is connected to the fluid supply hose 47. A wire support member 73 similar in construction to the wire support member 59 of FIG. 2 has a hook end 74 positioned about the nozzle 52 and a downwardly extended end 76 fastened by a screw 77 to the fire wall 19. The support member 73 extends through a hole 51 in the cowl 14 and is positioned above the horizontal wall 16 of the stepped section of the cowl.

The vertical position of the nozzle 52 is maintained and adjusted by an upright bolt 78 which is threaded into the horizontal wall 16 of the cowl. As shown in FIG. 9, the bolt 78 has a head 79 formed with an annular groove 81. A portion of the wire support member 73 is received in the groove 81 and retained therein by the biasing action of the resilient characteristics of the wire member. In order to adjust the position of the nozzle 52 the bolt 78 is rotated to vary the vertical position of the head 79 with respect to the wall 16. The wire support member 73 is carried with the head 79 and thereby changes the position of the nozzle 52 with respect to the cowl 14 as illustrated by dotted lines in FIG. 8.

The bolt and nut assembly 82 shown in FIGS. 10 and 11 may be substituted for the adjusting bolt 78 shown in FIG. 8 to provide the wire support member 73 with both vertical adjustment and transverse or horizontal adjustment. The assembly 82 comprises a downwardly projected bolt 83 which is threaded through the wall 16 of the cowl. A nut 84 is threaded onto the bolt 83 and is positioned between the head 86 of the bolt and the wall 16. As shown in FIG. 11, the nut 84 has a peripheral groove 87 which has a circular bottom wall 88 eccentric with respect to the threaded bore 89 of the nut 84.

A portion of the wire support member 73 is disposed in the annular groove 87 and engages a sector of the circular bottom wall 88. In order to transversely adjust the position of the nozzle 52 the nut 84 is rotated relative to the bolt 83. As illustrated in broken lines in FIG. 11, the bottom wall 88 being eccentrically disposed with respect to the axis of rotation of the nut 84 changes the transverse position of the wire member 73. The vertical position of the wire member 73 may be adjusted by rotating the bolt 84 into and out of the wall 16 of the cowl.

While specific embodiments of the present invention have been shown and described, it is to be understood that various changes and modifications may be made therein without departing from the spirit of the invention or the scope of the appended claims.

I claim:

1. In combination,
    (a) a vehicle cowl having a forward section and a louvered section with spaced openings,
    (b) a windshield washer nozzle connectable with a fluid supply tube,
    (c) flexible wire means having a first section connected to said nozzzle to position said nozzle in alignment with one of the openings in the cowl and a second section positioned adjacent the forward section of the cowl, and
    (d) means engageable with said second section of the wire means operative to secure said wire means to the cowl.

2. The invention defined in claim 1 including:
    (a) means connected to said cowl and flexible wire means for adjusting the position of the nozzle relative to the cowl.

3. The invention defined in claim 1 including:
    (a) a screw threaded into said cowl adjacent said wire means, and
    (b) means on said screw engageable with said wire means to adjust the position of the nozzle relative to the cowl in response to manipulation of the screw.

4. In a vehicle having a windshield and a cowl extended forwardly of the windshield terminating in a fire wall, said cowl having a downwardly stepped forward section and a louvered section with openings between the windshield and the stepped section,
   (a) a windshield washer nozzle adapted to be connected to a washer fluid supply line,
   (b) resilient means connected to said nozzle, and
   (c) means operatively connected to said resilient means and mounted on the fire wall adjacent the stepped section of the cowl to position said nozzle under said louvered section in alignment with one of the openings therein.

5. The invention defined in claim 4 including:
   (a) means connected to said cowl and engageable with said resilient means operable to adjust the position of the nozzle relative to the cowl.

6. The invention defined in claim 4 including:
   (a) actuator means adjusably secured to the cowl adjacent said resilient means, and
   (b) means on the actuator means associated with the resilient means to adjust the position of the nozzle relative to the cowl in response to adjustment of the actuator means.

7. In combination,
   (a) a vehicle having a fire wall and a cowl including a forward section and a louvered section with spaced openings,
   (b) a windshield washer nozzle connectable with a fluid supply tube,
   (c) resilient means having a U-shaped first section clamped about the nozzle for holding said nozzle in alignment with one of the openings in the louvered section, a second section extended over the forward section of the cowl and a third section positioned against the fire wall, and
   (d) means engageable with the third section of said resilient means operative to secure said resilient means to the fire wall.

8. The combination defined in claim 7 including:
   (a) means connected to the forward section of said cowl and operatively associated with the second section of said resilient means, said means having an adjustable member operable to change the position of the nozzle relative to the cowl.

9. A nozzle and nozzle support assembly for a vehicle windshield washer having a cleaning fluid supply tube comprising:
   (a) nozzle means having a fluid discharge orifice and a section connectable with said fluid supply tube,
   (b) flexible wire means having a U-shaped first section clamped about said nozzle means and a second section adapted to be attached to a portion of a vehicle,
   (c) said wire means deformable to move said nozzle means to an adjusted position, and
   (d) connecting means engageable with said second section to secure said wire means to said vehicle portion, and said wire means movable relative to said connecting means for adjustment.

References Cited by the Examiner

UNITED STATES PATENTS

| | | | |
|---|---|---|---|
| 1,016,281 | 2/1912 | Lundquist | 239—280 |
| 2,576,435 | 11/1951 | Bachrach | 239—284 |
| 2,921,744 | 1/1960 | Falcetti | 239—276 |
| 2,999,644 | 9/1961 | Nobinger | 239—280 |
| 3,056,177 | 10/1962 | Ruhala et al. | 239—284 |

FOREIGN PATENTS

| | | |
|---|---|---|
| 803,093 | 10/1958 | Great Britain. |
| 131,051 | 4/1929 | Switzerland. |

EVERETT W. KIRBY, *Primary Examiner.*